2,972,989
Patented Feb. 28, 1961

2,972,989

IRON OXIDE GRATE BARS

Kurt M. Meyer, Frankfurt am Main, Germany, assignor to Metallgesellschaft Aktiengesellschaft, Frankfurt am Main, Germany No Drawing. Filed Dec. 23, 1957, Ser. No. 704,268

Claims priority, application Germany Jan. 8, 1957

2 Claims. (Cl. 126—152)

This invention relates to grate bars for a sintering apparatus.

The objects of this invention are to produce grate bars of iron oxide and the process of making such bars.

It is customary to make lumps out of fine grain raw materials by sintering or pelletizing the materials, and then hard-burning the lumps. Either stationary or movable grates are used for the sintering or hard-burning. The sintering bed is composed of a grate coating layer covered by the material to be heat treated.

The metal grate plates originally used were exposed to such high temperatures as to cause the plates to warp, and the grate openings then became easily blocked by fine ore pieces. Consequently, these plates became replaced by single removable grate bars which functioned satisfactorily for most purposes.

However, these grate bars also burn, cake-up, and warp if they are subject to very high temperatures or very long material treatment times, which are, for example, greater than those required for the burning of cement. This is especially true in the sintering and hard-burning of pellets made from fine grain iron ores. Although in this case the temperatures are not higher than those used in burning cement and are in fact generally lower, as from 1,200° to 1,350° C., and the treatment times are much longer. While the highest temperature is about 1,650° C. in the burning of cement, it exists for only a fraction of a minute, whereas the treatment time in the sintering and burning of pellets extends over several minutes. Treatment times of ten minutes or more are necessary for the hard-burning of large pellets having diameters of from 15 to 25 mm., this being the size preferred by the buyers of the sintered ores. For technical reasons the hard-burning of the large pellets cannot be done by using solid fuels mixed with the pellets, but must be done exclusively by the use of hot gases. This means that not only are the heat requirements high, but also the heat transferred to the grate bars is much greater than that occasioned by the use of solid fuels.

Therefore, it is not surprising that grate bars of hematite cast iron or forged iron are replaced by bars composed of high heat strength metal alloys containing approximately 26 percent Cr and 3 to 12 percent Ni. This greatly increases the capital investment and limits the economy of the process, and so the suitability of these substitutes for the treatment of mass produced raw materials is called into question.

Grate bars composed of ceramic materials are self-eliminated as a possibility because of their much lower temperature change stability, and the greater danger of caking occurring between the ceramic oxides and the material being heat treated, even though the lower price of ceramics is economically attractive. Moreover, a ceramic material would be a different substance which could introduce damaging impurities into the material being treated under certain circumstances.

In this invention, these difficulties are avoided both technically and economically by using grate bars composed of iron oxide for the sintering and burning apparatus, respectively.

It has been discovered that finely divided iron oxide with from 1 to 10 percent, preferably from 2 to 4 percent, water added can be pressed without difficulty into grate bars which, after drying and hard-burning at from about 1,200 to 1,500° C., have sufficient strength. The finely divided iron oxide may be some technical iron oxide concentrate or fine grain iron oxide ore.

The shear strength of the hard-burned grate bars so produced will always be above 400 kg. per sq. cm. However, considerable decrease is observed after repeated chilling of the bars, as is unavoidable under practical conditions. So, heavy chilling 30 times repeated will cause breakage of from 25 to 50 percent of the grate bars. Another object of the invention is to provide a substantial reduction of the loss of shear strength caused by repeated chilling. This is done by adding to the moist mixture some already sintered material ground to the corresponding size. The addition is appropriately made in an amount of from 20 to 60 percent, preferably from about 45 to 55 percent. The grate bars so produced show, even after repeated chilling, a shear strength of at least 100 kg. per sq. cm. There is no breakage due to changes, even if chilling is done more than 100 times.

In one form of the invention, the grate bars are pressed of the same material, or suitable components thereof, from which the pellets being sintered, or being hard-burned, respectively, are made. It is thus possible to couple the raw material pelletizing or sintering processes with a process for a small production of grate bars. This eliminates grate bar transportation costs, and keeps movement damage and breakage to a minimum. In forming the grate bars, vibration alone does not produce the required strength for an iron oxide grate bar, but is advantageously combined with the pressing of the finely divided ore.

These iron oxide grate bars can neither corrode nor overheat. There is no waste, because if individual bars are broken by careless handling, the broken pieces can be added immediately to the burned pellets, or ore sinter, respectively, being processed, and the breakage becomes a part of the final product, such as the hard-burned lumpy iron oxide.

If desired, the grate bar strength is increased by the addition of small amounts of binding materials. Such binders are, for example, highly active clays such as bentonite, preferably in an amount from 0.5 to 5.0 percent, water glass, preferably from 0.2 to 3.0 percent, and especially lime as CaO or Ca(OH)$_2$ or other ground lime compositions. The amount of binder additive need not be more than 5.0 percent, and at times only 1.0 percent results in a considerable strength increase in the hard-burned grate bars. Also usable in the same proportions are Al$_2$O$_3$, MgO, and BaCO$_3$.

Lime as a strengthener is especially good as it creates great strength increase during hard-burning by forming calcium ferrite. Again lime does not add any foreign contaminating substances to the grate bars, and in any event, whatever lime is added to the iron oxide ores during the sintering or burning process will eventually become part of the lime required in the subsequent smelting process.

*Example 1.—Preparation of grate bars with no binder*

The grate bars were made from an iron oxide concentrate, 80 percent of which had been ground to 325 mesh, containing 70 percent iron. 45 parts by weight of the concentrate were mixed with 52 parts by weight of sintered pellets, made from the same concentrate, ground to a size of from 0.75 to 0.06 mm., and screened. The mixture was kneaded in a mixer together with 3 percent water and pressed into grate bars, using a spring die with 0.6 ton per sq. cm. pressure applied on both sides. The grate bars were hard-burned in an oxidizing atmosphere, with the temperature increasing gradually to max. 1,430° C. The shear strength of non-chilled grate bars was 490 kg. per sq. cm. Chilling brought it down to 130 kg. per sq. cm. when 30 times repeated, and to 100 kg. per sq. cm. when done 100 times. There was no breakage due to thermal stress, even if chilling was 100 times repeated. This was done by cyclic heating for 10 minutes in a furnace of 800° C. and 5 minutes' exposure to a cold air flow, carrying 0.5 cu.m. of cold air per minute and kilogramm of grate bars. The coefficient of linear thermal expansion was $11.35 \times 10^{-6}$ per degrees centigrade as an average, from 20 to 600° C.

*Example 2.—Preparation of grate bars with a binder additive*

42.5 parts by weight of the same iron oxide ore concentrate and 55 parts by weight of sintered pellets ground to the same size as in Example 1, together with 2.5 parts by weight kaolin and 3 parts by weight water, were pressed into bars, hard-burned, and tested according to Example 1. The shear strength was 590 kg. per sq. cm. before chilling, 170 kg. per sq. cm. after chilling 30 times repeated, and 100 kg. per sq. cm. after chilling done 100 times. The coefficient of linear thermal expansion was $11.42 \times 10^{-6}$ per degrees centigrade as an average, from 120 to 600° C. The pressure used was 0.6 ton per sq. cm. as in Example 1. Chilling, even if more than 100 times repeated, caused no breakage through thermal stress.

*Example 3.—Preparation of grate bars with sulfite liquor*

45 parts by weight of the iron oxide concentrate used for Example 1, with 25 parts by weight sintered pellets of the same concentrate, which had been ground to a size of from 0.06 to 0.2 mm. and screened, and 30 parts by weight sintered pellets ground to a size of from 0.2 to 0.5 mm., were mixed and kneaded with 3 parts by weight of a 20% sulfite liquor. Bars pressed from the mixture with a pressure of 1 ton per sq. cm. were hard-burned and tested according to Example 1. The shear strength was 590 kg. per sq. cm. before chilling, 150 kg. per sq. cm. after chilling 30 times repeated, and 90 kg. per sq. cm. after chilling done more than 100 times. There was no breakage caused by thermal stress.

*Example 4.—Preparation of grate bars with no addition of ground sintered pellets*

Grate bars with no additive of ground sintered pellets were also made and tested for comparison. The iron oxide ore concentrate used for Example 1, with no addition other than 3 percent water, was pressed into grate bars according to Example 1, applying a pressure of 1 ton per sq. cm. After hard-burning, the shear strength was 690 kg. per sq. cm., which means it was higher than that of the grate bars made with ground sintered pellets. However, chilling 30 times repeated brought it down to 90 kg. per sq. cm. This was already sufficient for 50 out of 100 test bars to break for the mere reason of thermal stress.

*Example 5*

Another type of grate bars was made again for comparison, using no ground sintered pellets, but a binder as a strengthening additive instead. The iron oxide concentrate of Example 1, mixed with 2.5 percent kaolin and 3 percent water, was pressed into grate bars according to Example 1, applying a pressure of 1 ton per sq. cm. and hard-burned. The shear strength of the non-chilled bars was 740 kg. per sq. cm. As little as 94 kg. per sq. cm. were measured after the material had been chilled 30 times. Thereby, 18 out of 100 test bars were broken for the mere reason of thermal stress.

Having now described the means by which the objects of the invention are obtained,

I claim:

1. In a grate having a plurality of spaced grate bars forming the bottom of the grate, the improvement comprising grate bars each consisting essentially of finely ground raw iron ore compressed into grate bar form and hard burned in an oxidizing atmosphere at a temperature of from about 1200° C. to 1500° C.

2. In a grate as in claim 1, said iron ore consisting essentially of iron oxide ore containing about 70 percent iron.

References Cited in the file of this patent

UNITED STATES PATENTS

| | | |
|---|---|---|
| 914,891 | Steinmetz | Mar. 9, 1909 |
| 1,715,449 | Curtis | June 4, 1929 |
| 2,365,720 | Neighbors | Dec. 26, 1944 |
| 2,418,467 | Ellis et al. | Apr. 8, 1947 |

OTHER REFERENCES

Searle: Refractory Materials, 3rd Ed., Griffin & Co., Ltd., London, 1950, pages 520 and 531.